United States Patent [19]

Wedel et al.

[11] 4,102,861

[45] Jul. 25, 1978

[54] EXTRUSION STABILIZATION OF POLYPYRROLIDONE BY HYDROQUINONES

[75] Inventors: Carroll J. Wedel, Walnut Creek; Phillip H. Parker, San Rafael, both of Calif.

[73] Assignee: Chevron Research Company, San Francisco, Calif.

[21] Appl. No.: 745,891

[22] Filed: Nov. 29, 1976

[51] Int. Cl.² .................................................. C08K 5/13
[52] U.S. Cl. ........................ 260/45.95 E; 264/176 R; 264/211
[58] Field of Search ............. 260/15.95 E, 78 S, 78 P; 264/176 R, 211

[56] References Cited

U.S. PATENT DOCUMENTS

| | | | |
|---|---|---|---|
| 2,682,563 | 6/1954 | Bell et al. | 260/45.95 E |
| 2,999,842 | 9/1961 | Csendes | 260/45.95 E |
| 3,017,393 | 1/1962 | Ney, Jr. | 260/78 P |
| 3,026,301 | 3/1962 | Ney, Jr. | 260/78 P |
| 3,052,654 | 9/1962 | Roth | 260/78 P |
| 3,072,615 | 1/1963 | Riedesel | 260/78 P |
| 3,260,697 | 7/1966 | Babler | 260/45.85 T |
| 3,424,821 | 1/1969 | Hunter | 260/45.95 E |
| 3,573,244 | 3/1971 | Wilken et al. | 260/45.95 B |

FOREIGN PATENT DOCUMENTS

| | | |
|---|---|---|
| 932,066 | 7/1963 | United Kingdom. |
| 572,136 | 9/1945 | United Kingdom. |

*Primary Examiner*—V. P. Hoke
*Attorney, Agent, or Firm*—Dix A. Newell; Thomas G. DeJonghe; Lawrence S. Squires

[57] ABSTRACT

Hydroquinone and alkylhydroquinone are thermal stabilization additives for normally solid polypyrrolidone at melt temperatures.

14 Claims, No Drawings

EXTRUSION STABILIZATION OF POLYPYRROLIDONE BY HYDROQUINONES

BACKGROUND OF THE INVENTION

Poly-2-pyrrolidone is the source of a useful synthetic fiber for the textile industry. The melt-spinnable white solid polymer is produced by the alkaline-catalyzed polymerization of 2-pyrrolidone in the presence of carbon dioxide (see U.S. Pat. No. 3,721,652). Polypyrrolidone so produced in melt-spun into filaments by extrusion from multi-hole spinnerets. In meltspinning, the polymer composition is extruded in a molten condition at a melt temperature which is generally greater than about 270° C. The extrusion must be carried out with care because of the tendency of the polymer to thermally degrade and revert to monomer. Degradation produces an unacceptable extrudate containing foam or bubbles. If extrusion is attempted at an appreciably lower temperature to avoid thermal decomposition, fibers of lower tensile strength are produced. Consequently, in order to melt extrude polypyrrolidone efficiently, one may either seek to increase the thermal stability of the polymer, or to improve the extrudability of the polymeric composition.

SUMMARY OF THE INVENTION

The thermal stability of poly-2-pyrrolidone at melt temperature is appreciably improved by the addition of hydroquinone or alkylhydroquinones. The poly-2-pyrrolidone composition comprises a major amount of normally solid poly-2-pyrrolidone and a thermal stabilizing amount of a hydroquinone. The melt extrusion of normally solid poly-2-pyrrolidone is improved by the inclusion of a minor amount of a hydroquinone in the polypyrrolidone.

DESCRIPTION OF PREFERRED EMBODIMENTS

A useful synthetic fiber is produced by the melt extrusion, at melt temperatures in the range of about 260°–280° C, preferably less than 275° C, and most preferably less than about 270° C, of a composition comprising a major amount of normally solid polypyrrolidone and a minor amount of hydroquinone or alkylhydroquinone.

The hydroquinones of the present invention are hydroquinone and alkylhydroquinones including dialkylhydroquinones, preferably the 2,5-dialkylhydroquinones. The alkyl substituents will normally be $C_1$–$C_{25}$ alkyl groups and preferably will be selected from $C_2$–$C_6$ alkyl. The alkyl substituents in the dialkylhydroquinones may be the same or different. Such alkyl groups encompass all the geometric and substitutional isomers in the $C_1$–$C_{25}$ alkyl class such as methyl, ethyl, propyl, isopropyl, butyl, isobutyl, t-butyl, hexyl, nonyl, dodecyl, etc. The hydroquinones are known compounds or are synthesized by known methods well within the skill of workers in the chemical arts.

The melt extrusion of normally solid poly-2-pyrrolidone is performed by the inclusion of a thermal-stabilizing amount, i.e., an extrusion-assisting amount, of the hydroquinone. Such amounts of hydroquinone are minor amounts based on polypyrrolidone, ranging from about 0.1 weight percent to about 10–15 weight percent, preferably 0.1–1 weight percent. The melt extrusion may be improved either by an appreciable lowering of the melt extrusion temperature due to the addition of the hydroquinone, or by reduction in the rate of monomer formation at the melt temperature, with the production of fibers having good tensile strength. The improvement is evidenced by a continuous extrusion of the filamentary poly-2-pyrrolidone composition at melt extrusion temperatures in the range of 260°–280° C, preferably less than about 275° C, without breaks, drips, foam or bubbles, using ordinary commercial spinning equipment known to the synthetic textile art.

The "normally solid" poly-2-pyrrolidone of the present invention is polypyrrolidone having a weight average molecular weight in excess of about 5000 and preferably in excess of about 50,000. The hydroquinone is normally added to the solid polypyrrolidone by coating pellets of the polymer with the hydroquinone before extrusion, or by pelletizing the polypyrrolidone resin with added hydroquinone, but any convenient method may be used.

Thermal stabilization is determined, among other methods, by the measurement of weight loss by the polypyrrolidone polymer on a Mettler FP-1 hot stage at 269° C over a period of 5 minutes, with and without the presence of the hydroquinone. The monomer produced by this heat treatment is completely removed by extraction with water. The difference in weight between the starting polymer and the thermally treated dry extracted polymer is the weight loss. The decrease in weight loss is represented as the percentage decrease in weight loss in the heat-treated additive-containing polymer compared to the heat-treated pure polymer. The hydroquinones produce an appreciable decrease in the weight loss as shown in the following table.

| Additive, % | Decrease in weight loss, % |
| --- | --- |
| 2,5-diisopropyl hydroquinone, 0.2 | 12 |
| 2,5-di-t-butyl hydroquinone, 0.2 | 9 |
| 2,5-di-t-amyl hydroquinone, 0.2 | 7 |
| p-benzoquinone, 0.2 | 0 |

What is claimed is:

1. A composition of matter comprising a major amount of normally solid poly-2-pyrrolidone and a thermal stabilizing amount of a hydroquinone compound selected from the group consisting of hydroquinone; $C_1$–$C_{25}$ alkylhydroquinone; and mixtures thereof, effective to reduce the thermal degradation of said poly-2-pyrrolidone to its monomer.

2. The composition of matter according to claim 1 wherein said hydroquinone compound is an alkylhydroquinone.

3. The composition of matter according to claim 2 wherein said alkylhydroquinone is a dialkylhydroquinone.

4. The composition of matter according to claim 3 wherein said alkyls are selected from among $C_2$–$C_6$ alkyl and may be the same or different.

5. The composition of matter according to claim 3 wherein said dialkylhydroquinone is 2,5-dialkylhydroquinone.

6. The composition of matter according to claim 5 wherein said 2,5-dialkylhydroquinone is 2,5-diisopropylhydroquinone.

7. The composition of claim 1 wherein said composition contains about from 0.1 to 15 weight %, based on the weight of said polypyrrolidone, of said hydroquinone compound.

8. A method of melt extruding normally solid poly-2-pyrrolidone at temperatures below about 275° C which comprises admixing therewith from about 0.1 to about 5 weight percent of a hydroquinone compound selected from the group consisting of hydroquinone; $C_1$-$C_{25}$ alkylhydroquinone; and mixtures thereof, whereby the thermal degradation of said poly-2-pyrrolidone to its monomer is reduced.

9. The method of claim 8 wherein about from 0.1 to 1 weight %, based on the weight of said polypyrrolidone, of said hydroquinone compound is used.

10. A method of melt extruding normally solid poly-2-pyrrolidone comprising admixing a thermal stabilizing amount effective to reduce the thermal degradation of said poly-2-pyrrolidone to its monomer of a hydroquinone compound selected from the group consisting of hydroquinone; $C_1$-$C_{25}$ alkylhydroquinone; and mixtures thereof, with said polypyrrolidone to form a mixture, and extruding said mixture at a melt temperature in the range of about 260°–280° C.

11. The method of claim 10 wherein about from 0.1 to 15 weight %, based on the weight of said polypyrrolidone, of said hydroquinone compound is used.

12. The method of claim 10 wherein about from 0.1 to 1 weight %, based on the weight of said polypyrrolidone, of said hydroquinone compound is used.

13. The method of claim 10 wherein said mixture is extruded at a melt temperature below about 275° C.

14. The method of claim 10 wherein said hydroquinone compound is an alkylhydroquinone and said mixture is extruded at a melt temperature below about 270° C.

* * * * *